May 24, 1938. R. F. HALL 2,118,705
AIRPLANE
Original Filed Oct. 23, 1933  3 Sheets-Sheet 1

Inventor
Randolph F. Hall

By _____
Attorney

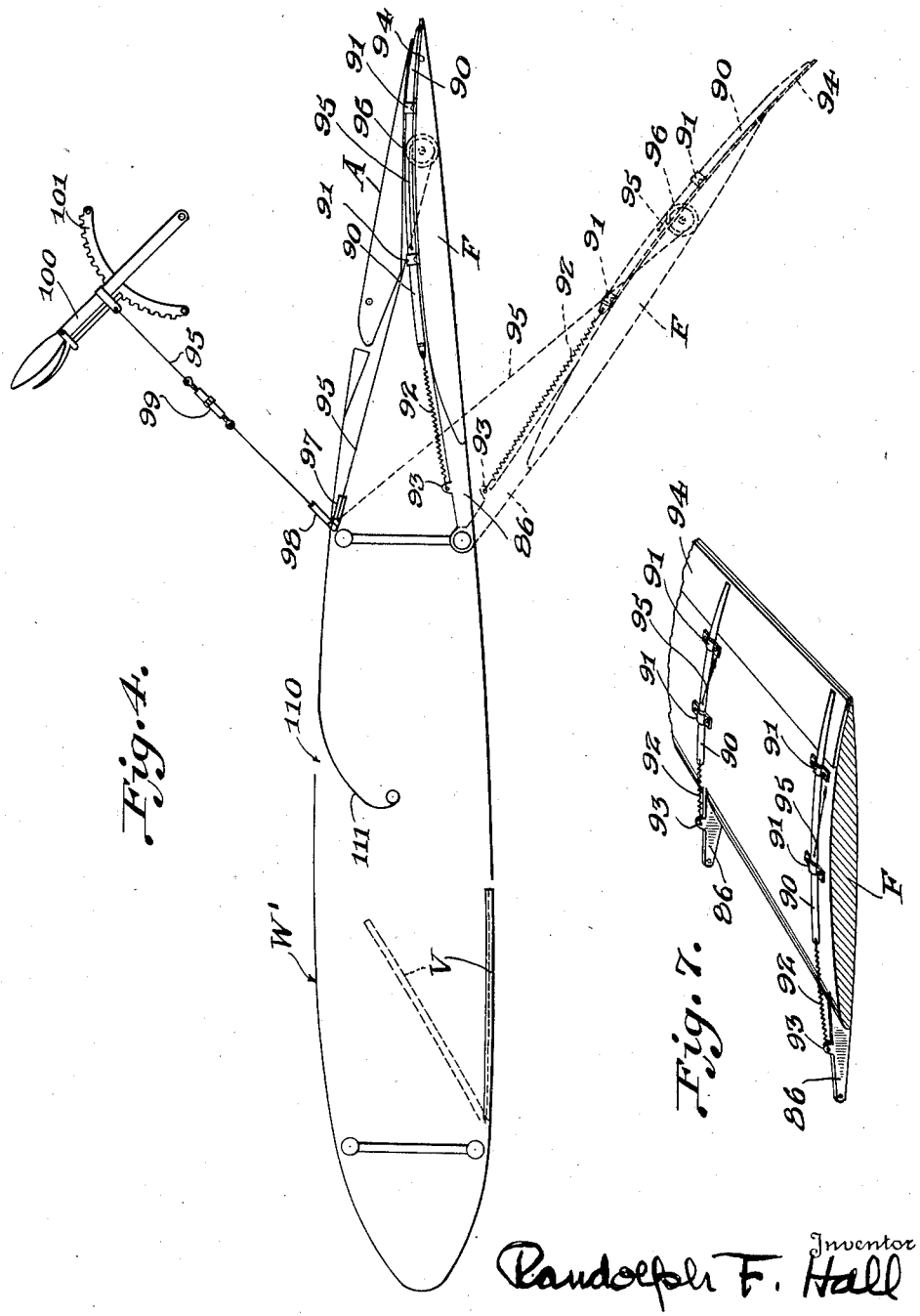

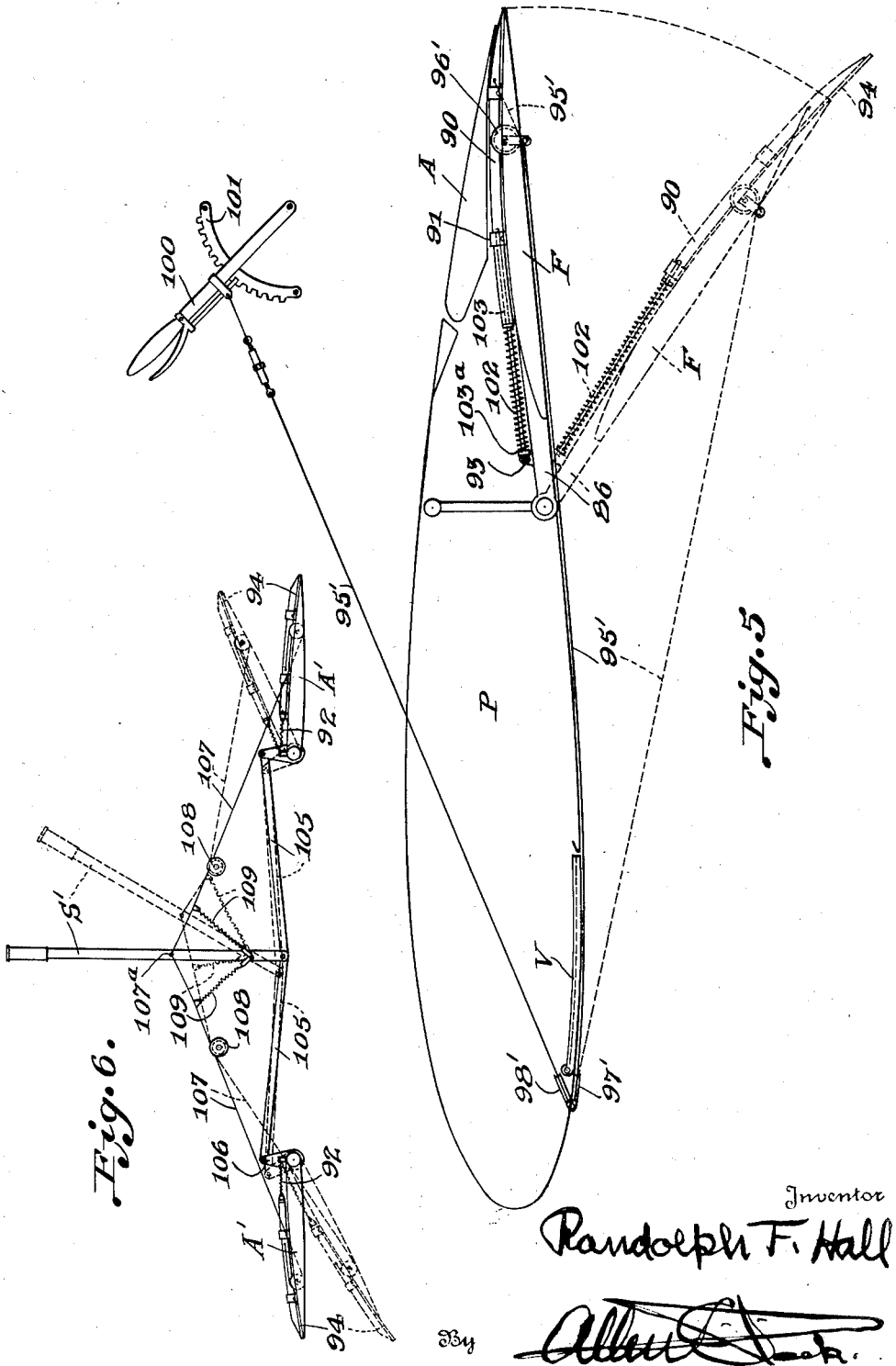

Patented May 24, 1938

2,118,705

UNITED STATES PATENT OFFICE 2,118,705

AIRPLANE

Randolph F. Hall, Rochester, N. Y.

Original application October 23, 1933, Serial No. 694,866. Divided and this application September 19, 1935, Serial No. 41,313

26 Claims. (Cl. 244—42)

The present invention relates to certain improvements in airplanes; and the nature and objects of the invention will be clearly recognized and understood by persons skilled in the aeronautical art in the light of the following explanation and detailed description of the accompanying drawings illustrating what I now believe to be the preferred embodiments or mechanical and aeodynamic expressions of my invention from among various other forms, embodiments, designs, combinations, and constructions, of which the invention is capable within the spirit and the broad scope thereof.

This application is a division of my pending U. S. application filed October 23, 1933, Serial No. 694,866, for Improvements in airplanes.

The invention of this application deals with the problems of modifying or trimming the characteristics of lateral control surfaces or ailerons, which modification will result in modifying the performance characteristics of the wing with which the surfaces are associated; and an object of the invention is to provide for such control surface modification by and under the control of the pilot during flight.

A specific feature of the invention resides in providing for the above lateral control surface, or aileron trimming, during flight by pilot controlled angular adjustment of the trailing edge portion of a lateral control surface or aileron and in the provision of a pilot operated means adapted to carry out such trailing edge angular adjustment on ailerons or control surfaces, as well as on wing flaps generally, whether of the manually actuated, or of the automatic or "floating" types.

The invention also includes as a feature, the provision of means for increasing the area of a movable surface such as a control surface, wing flap, or the like; and an object of the invention is to provide for such an area increase of a movable surface as the surface is moved from a normal or neutral position to a maximum angular position, and to reduce the area to normal when the surface is moved back to its normal or neutral position.

Another object of the invention is to provide for such area increase through the medium of a member mounted on the movable surface for projection therefrom to area increasing positions by movement of the surface from normal position, and retraction of such member as the surface moves to its normal position.

A further object of the invention is to provide for control by the pilot of such an area increasing member, independently of the movements of the movable surface with which the member is associated.

Another feature of the invention resides in the utilization of such variable area members for lateral control, either independently of or in cooperation with lateral control surfaces or ailerons, and in the operation of such members when associated with control surfaces or ailerons either independently thereof or in cooperation with the angular control movements of such surfaces.

An additional object of the invention is to improve the performance of the under flap types of variable lift wings in which an aileron is mounted above a portion of the span of an under flap, by providing an upper flap above the under flap inboard of the aileron, and operatively associating the upper and the under flap in such a manner that they operate simultaneously but with different angular movements.

With the above general objects, features and results in view, as well as certain others not specifically referred to but which will be readily recognized and apparent from the following explanation, my invention consists in certain novel features in design and in combination and construction of elements, all as will be more particularly referred to and specified in detail hereinafter.

Referring to the accompanying drawings:

Fig. 4 is a more or less schematic vertical transverse section through a wing of the variable lift type having a passageway and a trailing under surface flap, with the flap area increasing member and actuating and control system therefor, of the invention; the flap being shown by dotted lines in lowered position with the area increasing member projected.

Fig. 5 is a view similar to Fig. 4, but showing a modified form and arrangement of the actuating and control system for the flap carried variable area member, by which such member may be projectable independently of flap movement by and under control of the pilot.

Fig. 6 is a schematic view of a lateral control system and its operating means, with area increasing members mounted on and carried by the lateral control surfaces or ailerons, and a controlling and actuating system for the area increasing member; the lateral control being shown in neutral position by full lines, and by dotted lines in lateral control position with one aileron raised and the opposite aileron lowered.

Fig. 7 is a detail view in top plan of a portion of the wing under flap of Fig. 4 showing the mounting and arrangement of the area increasing member and actuating guide rods thereon.

Figure 1:
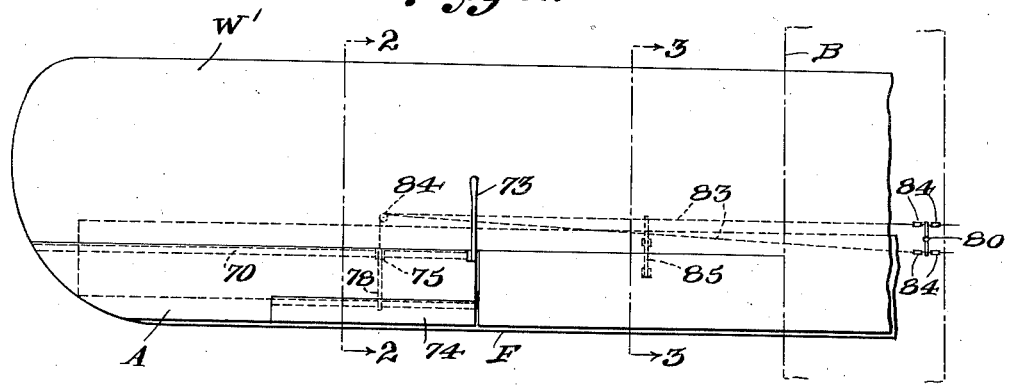
Fig. 1 is a top plan view of a wing of the variable lift flap type having an aileron thereon provided with an angularly adjustable trailing edge portion of the invention, a portion of the airplane fuselage being indicated and the pilot actuated control for the adjustable aileron portion also being schematically shown.
Figure 2:
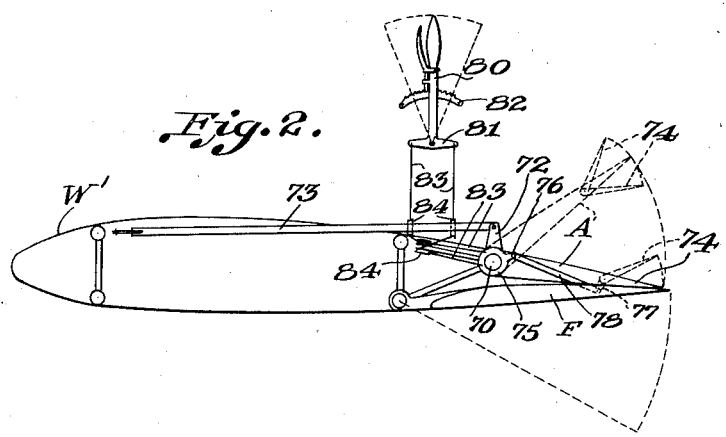
Fig. 2 is a vertical transverse, more or less schematic section taken as on the line I—I, of Fig. 1, showing the control for the adjustable aileron portion in relation to the aileron control; the aileron raised position and adjusted positions of its angularly adjustable portion being indicated by dotted lines.

As a feature thereof, my invention provides for trimming and/or modifying the characteristics of a lateral control surface or aileron and the performance of a wing, by a pilot during flight; and in the example of this feature here presented, such lateral control surface modification is carried out by angular adjustment of the trailing edge portion of the surface. Referring to Figs. 1 and 2 of the drawings, a wing W' which happens to be of the so-called variable lift type that includes the trailing under surface wing flap F vertically swingable to vary wing camber, is provided with a lateral control surface or aileron A forming a trailing portion of the upper surface of the wing above flap F.

The aileron A of wing W', referring particularly to Fig. 2 is vertically swingable with its shaft 70 forming the leading edge thereof in the usual manner for lateral control, shaft or tube 70 being provided with the horn 72 pivotally connected to the push-pull tube 73 actuated by the usual pilot control (not shown). By my invention I provide a trailing edge portion of the aileron A as pivotally mounted thereon for vertical swinging to angularly adjust such trailing portion relative to the aileron. The vertically swingable trailing edge portion or trimmer 74 of the aileron A may extend for only a portion of the aileron span as shown in the present example by Fig. 1, or it may extend for the entire aileron span as may be desired or found expedient. In a lateral control or aileron system of an airplane, the opposite wing ailerons will, of course, be each provided with a trailing edge portion or trimmer 74, and a suitable pilot controlled operating means is provided for angularly adjusting the trailing edge portions or trimmers of the ailerons in flight, as may be desired.

In Fig. 1, I have illustrated one wing W' of an airplane and have schematically indicated the body or fuselage B thereof, the opposite wing not being shown as it is a duplicate of the wing W' and is provided with the aileron A and trimmer 74 in all respects the duplicate of the wing W' as shown. Each aileron A is provided with a drum 75 or its equivalent, rotatively mounted on and around the tube or shaft 70, (see Fig. 2) and preferably intermediate the span of the aileron (see Fig. 1). The drum 75 is provided with the radially extended horn or crank 76, which is operatively coupled to a depending crank 77 at the leading edge of the trailing edge portion or trimmer 74 of the aileron, by a link 78, as clearly shown by Fig. 2. Thus, by rotating the drum 75 on and independently of an aileron A, the aileron trimmer 74 is vertically swung to angularly adjusted positions relative to its aileron.

A pilot actuated control lever 80 is mounted in body B in vertically disposed position and is pivotally mounted on an axis at its lower end for horizontal swinging in a direction fore and aft of the body B. A cross arm 81 is carried at the lower end of lever 80 and also extends in a fore and aft direction, while the usual toothed quadrant 82 is provided by which lever 80 is releasably locked, as may be desired, in any adjusted position to which swung. An operating cable for each aileron trimmer 74 on the opposite wing ailerons is provided and extends from the forward end of cross arm 81 out through the wing, around drum 75 and back to the rear end of cross arm 81, to which it is connected. Suitable pairs of pulleys 84 are provided for guiding and over which a cable 83 passes from the control lever 80 and through the wing to and around drum 75. It is understood, of course, that a cable 83 for each aileron trimmer 74 of the opposite wing aileron A, is provided and extends out through its respective wing and around the drum 75 for such aileron trimmer.

The aileron trimmer control system as thus arranged is actuated by the pilot by swinging handle lever forwardly or rearwardly the required extent to angularly adjust the aileron trimmers 74 in the desired direction, as may be desired. In this instance, but not so limited, forward swinging of the handle lever 80, causes simultaneous rotation of the drums 75, by the cables 83, respectively, in a direction to swing links 78 rearwardly and simultaneously raise the trimmers 74 on the ailerons. Rearward swinging of handle lever 80 will cause simultaneous downward swinging of the opposite aileron trimmers 74 to lowered positions on and relative to the ailerons. Obviously, with the flap type of wing shown in this example, when the flap F is in its raised position of Fig. 2, the trimmers 74 may not be downwardly swung to lowered positions, except a floating control be provided. This vertical swinging and angular adjustment of the aileron trimmers 74 can be carried out in any lateral control positions to which the ailerons A are swung, due to the arrangement of the cables 83 and drums 75 mounted on the aileron pivot or hinge axis, and further due to such arrangement the lateral control, vertical swinging movements of the ailerons A will cause but very small changes in the setting or angular adjustments to which the trimmers 74 may have been swung.

This feature of my invention for trimming the ailerons or lateral control surfaces to modify their characteristics and the wing performance with which associated, includes the combination therewith and incorporation therein of a floating aileron control such as disclosed in my U. S. Patent 1,846,965, to which reference is now made. In such combination, each aileron crank 72, instead of being rigidly secured to the aileron beam or shaft 70, is fastened to one end of the coupling devices C or C' of the patent disclosure. Such an arrangement will enable a measure of control of the aerodynamic properties (lift, drag, and center of pressure) of the wing, and will avoid excessive loss in lift of the floating ailerons of the patent, by trimming them with the trimmers 74 to float in a low position when desired, yet through the adjustment thereof will permit the retention of increased rolling control effectiveness with favorable yaw characteristics.

The provision for control surface trimming presented by this invention is not limited to the type of wing W' here disclosed but is generally adapted to control surfaces of conventional or other types of wings, and various arrangements of control surface operating systems, and aside from the results hereinbefore referred to, such trimming enables the pilot to change the "feel" of the control, to make experimental adjustments, and to laterally trim an airplane.

Figure 3:
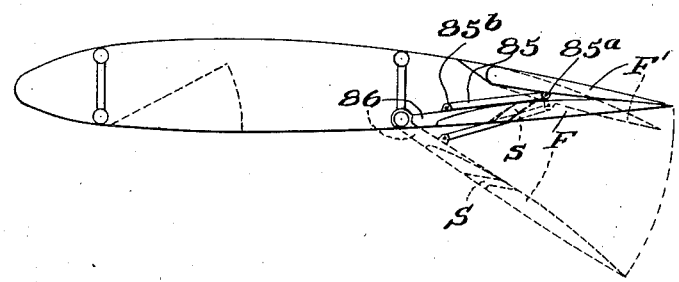
Fig. 3 is a more or less schematic vertical transverse section through the wing of Fig. 1, taken as on the line 3—3, and showing the upper wing flap inboard of the aileron with the connecting means between such flap and the wing under flap; the upper and under flap being shown in lowered positions by dotted lines.

In a type of wing such as W', shown in Figs. 1, 2 and 3, that includes the trailing under flap F and the aileron A above such flap for a portion of the wing span inwardly from the wing tip, as shown by Fig. 1, my invention provides an upper trailing flap F" extending inboard of the wing from the aileron A to the body or fuselage B of the airplane. Referring particularly to Fig. 3 in connection with Fig. 1, this upper flap F" is mounted for vertical swinging with the main flap F therebelow in order to increase wing lift, but in accordance with my invention, while the upper flap F" is simultaneously swingable with and in the same direction as the under flap F, its angular movement or extent of swing is in all cases less than that of the under flap.

The above result is accomplished in the example hereof, referring to Fig. 3, by a positive connection between upper flap F" and lower flap F, that embodies a link 85 pivotally connected at its rear end to the under surface of upper flap F" at 85a, spaced a distance rearwardly from flap F" leading edge or hinge axis. This link 85 extends forwardly and downwardly to and is pivotally connected at its forward end with a hinge arm 86 of the lower flap F, at the pivot point 85b on such arm; the lower flap F being of the type and mounted in accordance with my U. S. Patents 1,841,804, and 1,875,593. By such connection between the upper and lower wing flaps, the upper wing flap F" is swung downwardly and lowered to lift increasing position by and with the main under flap F, but due to the relative mounting of the link connection 85 therebetween the angular and downward movement of the upper flap is less than the angular downward movement of the lower flap F, as clearly shown by the dotted line, lowered, lift increasing positions of flaps F and F" in Fig. 3 of the drawings.

In those forms of flap wing, such as the wing W', where a force means is utilized, as referred to and explained in my hereinbefore identified U. S. patents, with the lower flap F, such means may serve for both the upper and lower flaps for automatic flap operation. So, if desired, for its aerodynamic effect on the upper and under flaps when lowered in lift increasing positions, the lower or under flap F may be provided with a slot or slots S therethrough to increase airflow between the flaps in their lowered positions. As disclosed in Fig. 3 of the drawings, a slot S is located in the forward portion of the under surface trailing flap F, that is, disposed forward of the center of the flap.

With the variable lift wings of the flap types, my invention includes increasing the area of the wing flap as the flap moves or swings downwardly, to thereby increase the lift capacity of the wing. As an example of a mechanical embodiment of such area increasing feature of the invention, I have disclosed wings in Figs. 4 and 5 of the drawings that include an under trailing flap F whose area is increased as the flap swings downwardly to lift increasing position. The wings W' of Figs. 4 and 5 are of the so-called "Hall" type, and are more or less diagrammatically illustrated in the referred to Figs. 4 and 5, as including the passageway P having its forward inlet end controlled by vane V, and its rear discharge end controlled by the vertically swingable trailing under surface flap F. An aileron A is mounted above flap F for usual vertical swinging, as a part of the trailing portion of the upper surface of wing W'.

The flap F is mounted and carried on the hinge members 86, as referred to hereinbefore in connection with Fig. 3 of which hinge members there may be any number spaced along the span of the flap, as indicated by Fig. 7. A series of rods 90 (see Fig. 7) are mounted on the upper side and chordwise of the flap F, spaced apart spanwise thereof and slidably spaced bearings 91 fixed on the upper side of the flap. The rods 90 are in this instance substantially alined with hinge members 86 of the flap and are suitably longitudinally curved to conform to flap upper surface camber and permit of sliding in the bearings 91 in a direction chordwise of the flap without binding or interference. In the form of this feature of my invention shown in Figs. 4 and 7, a coiled expansion spring 92 connects the forward end of each sliding rod 90 with a fixed point or lug 93 on the alined hinge member 86 of the flap, and these springs normally draw the rods 90 forwardly of the flap. A plate or area increasing member 94 is attached to and across the rear ends of rods 90 in position on the upper surface of flap F and extend spanwise thereof along and adjacent the flap trailing edge for the full span, or any extent of the span, of flap F, as may be desired. Where the plate member 94 extends beneath aileron A, the under surface of the aileron is preferably cut out or formed for operating clearance of member 94 and its rods 90.

The plate or area increasing member 94 in normal position on Flap F with rods 90 drawn forwardly by springs 92, is positioned forwardly of the flap trailing edge, or at least with its trailing edge substantially along the flap trailing edge. However, by forcing rods 90 rearwardly against and expanding springs 92, the plate member 94 is moved rearwardly by these rods to position extended or projected rearwardly beyond the flap trailing edge to increase the area of the flap, as will be clear by reference to the dotted line position of plate member 94 in Fig. 4.

Following my invention, the area increasing member 94 of a wing flap F is automatically projected and retracted as the flap lowers and raises, and a possible mechanism to that end is disclosed in Figs. 4 and 5, as including a cable 95 secured at one end to a guide rod 90 and extending rearwardly to and forwardly around a vertically disposed pulley 96 mounted on and carried by the flap F. From the pulley 96, the cable 95 extends forwardly and upwardly through the wing to a horizontally disposed pulley 97 mounted on the wing structure, and then extends inwardly through the wing to the airplane body or fuselage, passing over a pulley 98 at the inner or root end of the wing. A handled control lever 100 is pivotally mounted at a suitably convenient point in the airplane body and is associated for releasable locking in an adjusted position in the usual manner with a conventional toothed quadrant 101. The cable 95 extends from pulley 98 to and is connected with handle lever 100, and a turnbuckle 99 is preferably interposed in cable 95 between pulley 98 and lever 100 for making desired adjustments in the cable.

If desired, branches of cable 95 may run to each guide rod 90 or to any desired number thereof, with a pulley 97 for each branch cable, as may be found expedient. The foregoing arrangement of area increasing member 94 and its control system is of course duplicated on opposite wings of an airplane for their respective flaps F, and the operating cables 95 for the opposite wing flap area increasing members extend to and are connected with the control lever 100.

In operation, with the control lever 100 in the position of Fig. 4, the relation of the flap pulleys 96 to the wing pulleys 97 is such that with the wing flaps F in normal raised position of Fig. 4, the springs 92 function to withdraw area increasing members 94 to their retracted positions, but when the flaps F are lowered, lever 100 remaining fixed, the cables 95 pull or force the members 94 into their projected flap area increasing positions shown by dotted lines in Fig. 4. When the flaps F raise and swing back to normal raised position, the pull on cables 95 is released and springs 92 function to withdraw and retract the flap area increasing members to their normal positions. In any flap lowered position, the pilot can by swinging lever 100 forwardly, retract the projected area increasing members against the force of springs 92, as may be desired, and usually the lever 100 will not be rearwardly swingable from its normal position shown in Fig. 4, for the purpose of projecting an area increasing member 94 when a flap F is in raised position.

In order to permit the pilot to extend and control the flap variable area members for all flap settings, including fully raised position of a flap, for increasing lift and modifying the airfoil characteristics or longitudinal balance of an airplane, the system of Fig. 5 may be utilized. In such system an expansion spring 92 is replaced by a compression spring 102 mounted on a rod 103 connected at its forward end to hinge arm lug 93 and slidably extended into a guide rod 90, the spring being held between the forward end of a guide rod and a cap 103a at the forward end of rod 103. Thus, a spring 102 normally tends to expand and force flap area increasing member 94 rearwardly to extended area increasing position. A cable 95' is connected to a guide rod 90 rearwardly of the flap carried pulley 96', and extends forwardly beneath this pulley below flap F and the wing under surface, to a wing carried pulley 97' mounted forwardly of wing passage inlet vane V. From pulley 97', cable 95' extends inwardly of the wing, around pulley 98' and rearwardly into the airplane body where it is connected to control lever 100.

With control lever 100 set as shown in Fig. 5, when flap F is raised, the cable 95' pulls and maintains area increasing member withdrawn in its inactive position against and compressing spring 102; but when the flap F lowers, the slack established in cable 95' permits spring 102 to expand and force member 94 rearwardly to projected area increasing position. Thus, with such system, even with flap F in its raised position, the pilot can by releasing cable 95' through forward swinging of lever 100, project an area increasing member to any desired extent by the expanding action of a spring or springs 102. Retraction of an area increasing member 94 against the spring 102 from a projected position, in any setting of flap F, lowered or raised, can be accomplished by swinging lever 100 rearwardly to pull cable 95' and draw member 94 inwardly onto flap F. The invention also includes individual control for the area increasing members 94 of opposite wing flaps F of an airplane for the purpose of lateral trim and as an emergency lateral control.

It should be noted here that with the system of Fig. 4, where force units or means are employed with the wing flaps F for automatic flap operation, such as hereinbefore referred to, the flap force units will have to be of somewhat greater force magnitude than for the arrangement of Fig. 5.

If desired, the variable area members 94 may extend for part or full span of one or more wings, and a variable flap area member may in projected position extend beyond the flap trailing edge surface in projected position to leave a slot between the flap trailing edge and the area increasing member leading edge. Also, the variable area members 94 may be provided as accessory units for ordinary flaps with or without the control extending to the pilot's cockpit.

The variable area members in accordance with the principles of this feature of my invention may be embodied with the lateral control surfaces or ailerons of an airplane lateral control system, to function either independently of control surface movement, or by and as a result of such movement. In Fig. 6 of the drawings, I have schematically illustrated such an adaptation of the invention to a lateral control system, that includes the usual pilot's control stick S', opposite ailerons A' and the links 105 connecting stick S' with the control cranks 106 of ailerons A'. Lateral swinging of control stick S' will cause differential vertical swinging of opposite ailerons A' in the conventional manner.

Each aileron A' is provided with a variable area member 94 slidably mounted on the upper surface thereof and associated with the tension springs 92 and the cable 107, all in substantially the same manner as described in connection with Fig. 4 of the drawings. The cable 107 from each aileron carried variable area member 94 extends to and is connected with the control stick S' at the point 107a, passing over a suitable pulley, or pulleys 108 between the control stick S' and its aileron A'. A spring or the like 109 is connected between the pivotal axis of lateral swing of control stick S' and each cable 107, intermediate cable pulley 108 and the control stick, these springs 109 continuously tending to pull the cables toward the stick and against pulleys 108 for the purpose of maintaining the cables taut and taking up slack.

With the control stick S' and ailerons A' in neutral position as shown by full lines in Fig. 6, the area increasing members 94 on the ailerons are in retracted position, but upon swinging of the control stick for lateral control to raise one aileron and lower the other, then the pull by the stick on cable 107 on the downwardly swinging aileron will project the area increasing member 94 thereon, while the member 94 on the raising aileron remains in retracted position. Such functioning of the area increasing members 94 is shown by dotted line positions of the stick, ailerons and area increasing members 94, in Fig. 6. In this manner the area of the aileron on the proper side of the airplane is increased to increase lift and provide rolling control.

However, the aileron area increasing members 94 may be utilized independently of control actuation of the ailerons, by disconnecting links 105 from the ailerons A' and control stick S', for lateral control. Such operation will be obvious from Fig. 6 and consists in projecting one member 94 while the other remains in retracted position.

The variable area members 94 of Figs. 4 to 7, may be directly mounted on or within the trailing portion of a wing, instead of to a movable surface, for the purpose of increasing lift, for modifying the wing characteristics, and/or for lateral or other control and balancing or trimming purposes.

With a variable lift wing of the type of the wings W' here illustrated, and including the air displacement passage P, referring now to Fig. 4 of the drawings, a longitudinally or spanwise disposed slot 110 is provided through the upper skin or covering of the wing in communication with the longitudinal wing passage P. Such slot 110 is located in the instant example spaced forwardly from the aileron A and under flap F, and a suitable deflector plate or member 111 is provided within passage P extending forwardly and downwardly from the upper surface or skin of wing W' along and adjacent the rear edge of slot 110 and into passage P. This deflector terminates spaced above the lower surface of the wing within the passage P for rearward flow of air therepast, but extends forwardly across and spaced below slot 110 to direct air upwardly through the slot from passage P.

Such a slot 110 increases the lift of the wing and where located forwardly of the lateral control surface or aileron A will increase the lateral control effectiveness, due to the increased airflow over the upper surface of the wing which tends to retard the condition of stall. While the deflection 111 adds to the effectiveness of slot 110, it is not in all respects essential to the increased efficiency obtained from the slot, and may be eliminated where desired.

It will also be evident that various changes, modifications, substitutions, additions and eliminations might be resorted to in the several illustrated examples of the various features of my invention, without departing from the spirit and scope of the invention, and hence, I do not desire to limit myself in all respects to the exact and specific disclosures hereof.

What I claim is:

1. In a variable lift wing, a vertically swingable under trailing flap extending for the major portion of the wing span, ailerons on the wing forming trailing portions of the wing upper surface above said under flap at opposite outer portions of the flap span, a vertically swingable upper flap inboard of said ailerons above the under flap, and operative connections between the under flap and said upper flap for swinging the upper flap by vertical swinging of the under flap, said connections arranged to impart less angular movement to the upper flap than the angular movement of the lower flap.

2. In an airplane wing, a vertically swingable under flap, a vertically swingable upper flap, connections between said flaps for simultaneously lowering and raising of the under and upper flaps, and said connections arranged relative to the flaps so that the angular movement of the upper flap is less than the angular movement of the under flap when said flaps are either raised or lowered.

3. In combination, a wing, a pivotally mounted control surface thereon, means for swinging said surface to and from a normal neutral position on the wing, an area increasing member mounted on the control surface for projecting from normal position thereon to positions increasing the area of the control surface, force means normally maintaining said member in retracted position and mechanism operatively connecting said area increasing member with the means for swinging the control surface for actuation to project said member against said force means when the control surface is swung from a neutral position.

4. In combination, a wing, opposite ailerons mounted on the wing, a pilot's control for actuating said ailerons to swing one upwardly and the other downwardly, a member on each aileron for projection to position increasing aileron area, force means normally maintaining said member in retracted position, and means operatively coupling said aileron area increasing members with and for actuation by operation of the pilot's control to project the member on a downwardly swinging aileron to area increasing position against the retracting action of said force means.

5. In a variable lift wing having a longitudinal air displacement passage therethrough from an inlet adjacent the wing leading edge to and discharging at the wing trailing edge; a trailing under flap on the wing; an aileron mounted on the wing above said flap for vertical swinging; and said wing provided with a spanwise disposed slot through the upper surface of the wing spaced a substantial distance forwardly of said aileron and intermediate said passage inlet and the aileron, and said slot in communication with said air displacement passage and constructed and arranged for discharging air therefrom above the upper surface of the wing rearwardly toward said aileron.

6. In a variable lift wing having a longitudinal air displacement passage extending rearwardly therethrough; a trailing under flap on the wing; an aileron mounted on the wing above said flap for vertical swinging; said wing provided with a spanwise disposed slot through the upper surface of the wing spaced a substantial distance forwardly of said aileron and in communication with said air displacement passage for discharging air rearwardly above the upper surface of the wing, and a surface along the rear side of said slot extending forwardly and downwardly into said wing air displacement passage to form an air flow guiding wall to the slot.

7. In an airplane wing, a vertically movable under trailing flap extending for the major portion of the wing span, an aileron on the wing forming a part of the wing upper surface above said under flap at the outer portion of the flap span, a vertically movable upper flap inboard of said aileron above the under flap, and operative connections between the under flap and said upper flap for moving the upper flap by movements of the under flap.

8. In combination, a wing, a lateral control surface on the wing, a variable area member on the control surface for projection to increase area of the control surface, and means actuated by movement of the surface for projecting said member, and pilot actuated means for independently controlling said variable area member.

9. In combination, a wing, a vertically movable flap on the wing, a variable area member on the flap for projection therefrom to increase the area of the flap, means actuated by downward movements of the flap to cause projection of said member to area increasing position, and pilot actuated means for projecting said member independently of projection thereof by flap downward movement.

10. In a wing, in combination, a vertically movable flap on the wing, a variable area member on the flap for projection from normal position thereon to area increasing position, mechanism automatically projecting said member by lowering of the flap and retracting the member by raising of the flap, and pilot controlled means for projecting and retracting the area varying member independently of the automatic operation thereof and in any position of the flap.

11. In combination, a wing, opposite ailerons mounted on the wing, a pilot's control means for actuating said ailerons to swing one upwardly and the other downwardly, a projectable member on each aileron for increasing the area thereof, means coupling said aileron area increasing members with and for actuation by operation of the pilot's control means to move the member on a downwardly swinging aileron to projected aileron area increasing position, and said means detachable from the area increasing members for operation of the members independently of the pilot's control means.

12. In combination, a wing, a vertically movable under trailing flap mounted on the wing, a vertically swingable aileron mounted on the wing above and forming a portion of the upper surface of the wing, an area increasing member on the wing flap movable between normal retracted position and projected flap area increasing position, and means controlled by downward movement of said flap for projecting said member to area increasing position thereon.

13. The combination with a movable aircraft surface, of an area increasing member mounted thereon for movement between normal retracted position and projected position increasing the area of said surface, means continuously acting to project said member, means normally restraining said member in retracted position, and said restraining means constructed and arranged to release said member for projection upon movement of said surface in one direction.

14. The combination with a movable aircraft surface, of an area increasing member mounted on said surface for movement between retracted position and projected position increasing the area of said surface, means continuously acting to project said member to area increasing position, means normally restraining said member against projection, said means constructed and arranged to release said member for projection by the movement of the surface in one direction and to retract the member by movement of the surface in the opposite direction, and pilot operated mechanism for actuating said restraining and retracting means independently of the movement of said aircraft surface.

15. The combination with a movable aircraft surface, of an area increasing member mounted thereon for movement between normal retracted position and projected position increasing the area of said surface, means continuously acting to retract said member, means rendered operative by the movement of the surface in one direction for projecting said member to area increasing position against the action of said retracting means, and pilot operated mechanism operatively coupled with said projecting means for actuating the same to release said area increasing member for retraction by said retracting means when the surface is in position with said member projected.

16. The combination with a movable aircraft surface, of an area increasing member mounted thereon and movable between retracted position and projected position increasing the area of said surface, means controlled by movement of said surface for projecting said member when the surface is moved in one direction and for retracting said member when the surface is moved in the opposite direction, and pilot actuated mechanism for controlling movement of said member independently of the movement thereof caused by movement of said aircraft surface.

17. In combination, a wing, opposite vertically swingable ailerons on the wing, a pilot's control means operatively connected with said ailerons for differentially vertically swinging the same, an area increasing member on each aileron mounted for movement between retracted position and projected position increasing the area of the aileron, means acting to continuously retract each aileron area increasing member, and means coupling each area increasing member with the pilot's control means and actuated by operation of said latter means, and said coupling means so constructed and arranged that the area increasing member on a downwardly swinging aileron is projected thereby against said retracting means to aileron area increasing position.

18. In combination, a wing, opposite vertically swingable ailerons on the wing, a pilot's control means operatively connected with said ailerons for differentially swinging the same, an area increasing member on each aileron mounted for movement between retracted position and projected position increasing the area of the aileron, means operatively coupled with and actuated by the pilot's control means for projecting and retracting the area increasing members of said ailerons, and said projecting and retracting means so constructed and arranged relative to the pilot's control means as to project the area increasing member on a downwardly swinging aileron and retract the member on an upwardly swinging aileron.

19. In combination, a wing, a flap pivotally mounted on said wing, pilot operated means for swinging said flap to and from normal position on the wing, an area increasing member mounted on the flap for projection from normal position thereon to positions increasing the area of the flap, and mechanism operatively connected to and between the area increasing member and the pilot operated means for swinging the flap, said mechanism so constructed and arranged that pilot operation of said flap swinging means to swing the flap from neutral position actuates said mechanism to project said member to area increasing positions.

20. An aircraft including an airfoil, a movable surface on said airfoil, an area increasing member mounted on said movable surface and disposed spanwise thereof for movement between normal retracted position and projected position increasing the area of said surface, means operatively connected to said member intermediate the span of the member and constructed and arranged to continuously act to move said member in one direction in any projected position of the member, other means arranged to be rendered operative by movement of said surface in one direction whereby to cause the area increasing member to move against and in a direction opposite the direction in which the member is moved by said continuously acting means, and the said other means operatively connected between the movable airfoil surface and fixed structure of the aircraft.

21. The combination with a movable aircraft surface, of an area increasing member mounted thereon and disposed spanwise thereof for movement between normal retracted position and projected area increasing position, means operatively connected to said area increasing member at spaced intervals along the span of the member, said means constructed and arranged to continuously act to move said member in one direction in any projected position of the member, and other means arranged to be rendered operative by movement of the aircraft surface in one direction whereby the area increasing member is caused to move against and in a direction opposite the direction in which the member is moved by said continuously acting means.

22. In an airplane wing, a vertically swingable under surface flap, a vertically swingable upper surface flap, connections between said flaps for simultaneously lowering and raising the said under and upper surface flaps, said flaps in normal raised position carrying out the normal airfoil section of said wing, and in lowered positions spaced apart to form an air passage therebetween and the said under surface flap provided with a slot therethrough in the forward portion thereof and disposed spanwise of the flap for flow of air rearwardly therethrough into the space between said lowered flaps.

23. In combination, an airfoil, an angularly displaceable trailing under surface flap mounted on the airfoil, said flap having a slot therethrough disposed spanwise thereof and located forward of the center of said flap, and said slot adapted for passage of air rearwardly therethrough from the forward under surface of the flap to the rear upper surface of the flap when the flap is in position lowered from the airfoil.

24. In combination, an airfoil, an angularly displaceable trailing under surface flap mounted on the airfoil, said flap mounted and arranged so that the leading edge thereof is spaced from the airfoil when the flap is in lowered position to provide an air passage between the flap leading edge and the airfoil, and the said flap also having a slot therethrough disposed spanwise thereof and located forward of the center of said flap, whereby with the flap in lowered position, air flows rearwardly through the slot from the forward under surface of the flap to the upper rear surface of the flap.

25. In combination, an airfoil, having an air passage extending rearwardly therethrough and discharging at the trailing portion of the airfoil, an angularly displaceable trailing under surface flap mounted on the airfoil and in normal raised position disposed at the discharge end of said airfoil passage, said flap having a slot therethrough disposed spanwise thereof and located forward of the center of said flap, and the said slot adapted for passage of air rearwardly therethrough from the forward under surface of the flap to the rear upper surface of the flap when the flap is in lowered position.

26. In combination, a wing, a vertically movable flap mounted on the under surface of the wing, a variable lift member on the flap for projection therefrom to positions increasing the lift of the flap, means actuated by downward movements of the flap to cause movement of said member to lift increasing position, and pilot actuated means for moving said member independently of movement of the member by the downward movements of the flap.

RANDOLPH F. HALL.